US007693510B2

(12) United States Patent
Shaw

(10) Patent No.: US 7,693,510 B2
(45) Date of Patent: Apr. 6, 2010

(54) CHARGING CONTROL SYSTEM FOR GROUP COMMUNICATION SESSIONS

(75) Inventor: Christopher Shaw, Bristol (GB)

(73) Assignee: Orange Personal Communications Services Limited, Bristol (GB)

( * ) Notice: Subject to any disclaimer, the term of this patent is extended or adjusted under 35 U.S.C. 154(b) by 799 days.

(21) Appl. No.: 11/563,105

(22) Filed: Nov. 24, 2006

(65) Prior Publication Data

US 2007/0160183 A1 Jul. 12, 2007

Related U.S. Application Data

(63) Continuation of application No. PCT/GB2005/002343, filed on May 24, 2005.

(30) Foreign Application Priority Data

May 24, 2004 (GB) ................................. 0411538.2

(51) Int. Cl.
*H04M 11/00* (2006.01)
*H04M 15/00* (2006.01)
(52) U.S. Cl. ....................... 455/416; 455/406; 455/408; 379/114.2; 379/202.01
(58) Field of Classification Search ................. 379/111, 379/114.01, 114.2, 114.28, 114.29, 121.01, 379/201.01, 203.01, 205.01, 207.01; 455/405–408, 455/416
See application file for complete search history.

(56) References Cited

U.S. PATENT DOCUMENTS 7,013,125 B2 * 3/2006 Henrikson et al. .......... 455/406

7,151,824 B1 * 12/2006 Bingaman et al. ...... 379/114.22
7,602,893 B2 * 10/2009 Bhatia et al. ............ 379/202.01
2002/0071540 A1 * 6/2002 Dworkin ................. 379/202.01

(Continued)

FOREIGN PATENT DOCUMENTS

EP 0 526 118 A2 3/1993

(Continued)

OTHER PUBLICATIONS

Jing, Wang, et al. "The Study on Implementing GPRS Intelligent Networks and Its Services." Communication Technology Proceedings, 2003. ICCT 2003, Apr. 9-11, 2003, Piscataway, NJ, USA, IEEE, vol. 2, pp. 1678-1682.

(Continued)

*Primary Examiner*—Binh K Tieu
(74) *Attorney, Agent, or Firm*—Knobbe Martens Olson & Bear, LLP

(57) ABSTRACT

The invention relates to a system for controlling communication between user terminals using a telecommunications network. One embodiment includes an interface between a real-time charging control system for controlling usage of network resources during such usage and a group communications control node which is capable of controlling group communications sessions. Improved real-time charging control mechanisms can be implemented to account for usage of group communications services, for example where charging for an entire group communications session may be applied to a selected single party. Charging for a group communications session may be conducted with the flexibility of being able to charge according to the number of participants without having to transmit separate charging control signals from each participant's leg of the session to the real-time charging control system, thus reducing the signaling load in the network.

27 Claims, 5 Drawing Sheets

U.S. PATENT DOCUMENTS

| | | | |
|---|---|---|---|
| 2002/0151321 A1* | 10/2002 | Winchell et al. | 455/519 |
| 2003/0144951 A1 | 7/2003 | Leven | |
| 2004/0141606 A1* | 7/2004 | Torvinen | 379/202.01 |
| 2004/0203710 A1* | 10/2004 | Gabor et al. | 455/422.1 |
| 2006/0035623 A1* | 2/2006 | Senn et al. | 455/406 |
| 2006/0178130 A1* | 8/2006 | Makrygiannis | 455/406 |

FOREIGN PATENT DOCUMENTS

| | | |
|---|---|---|
| EP | 0 920 178 A2 | 2/1999 |
| JP | 2001298545 | 10/2001 |
| JP | 2003318993 | 11/2003 |

OTHER PUBLICATIONS

Travostino, Franco. "Towards an Active IP Accounting Infrastructure." Proceedings of Open Architectures and Network Programming 2000, IEEE Third Conference, Tel Aviv, Israel, Mar. 26-27, 2000, Piscataway, NJ, USA.

International Search Report, Aug. 3, 2005.

* cited by examiner

Prior Art

US 7,693,510 B2

CHARGING CONTROL SYSTEM FOR GROUP COMMUNICATION SESSIONS

CROSS-REFERENCE TO RELATED APPLICATIONS

This application is a continuation, under 35 U.S.C. §120, of International Patent Application No. PCT/GB2005/002343 filed May 24, 2005 under the Patent Cooperation Treaty (PCT), which was published by the International Bureau in English on Dec. 8, 2005, with International Publication Number WO 2005/117344 A1, which designates the United States and claims the benefit of GB Application No. 0411538.2, filed May 24, 2004. All above-referenced prior applications are incorporated by reference herein in their entirety and are hereby made a portion of this specification.

BACKGROUND OF THE INVENTION

1. Field of the Invention

The present invention relates to telecommunications networks, and particularly but not exclusively to mobile communications networks, and in particular to such a network having a group communications node capable of controlling group communications sessions.

2. Description of the Related Art

Telecommunications networks providing communications services in which group communications sessions supported are known. One such group communications service is group conference calling, in which participants conduct full duplex voice calls with the remainder of the group. Another is a voice dispatch service, in which participants conduct half-duplex communications with the remainder of the group.

An example of a mobile communications system which provides a voice dispatch service, also known as Push To Talk (PTT), is the Motorola™ integrated digital enhanced network, or iDEN™, system. The system includes Enhanced Base Transceiver Systems (EBTSs) at cell sites which link mobile terminals to the fixed network equipment via a radio interface, and which are connected to controlling base station controllers (BSCs). The BSCs provide a link with a switching node that provides conventional circuit switching with a public services telephone network (PSTN), and a Metro Packet Switch (MPS), which provides switching for the dispatch service. A Dispatch Application Processor (DAP) coordinates and controls dispatch communications, by registering the identifications and locations of mobile terminals active in the system.

Conventional cellular communications networks, for example those conforming to the Global System for Mobile Communications (GSM) standard, have in the past provided voice call services via a circuit-switched network. GSM was originally designed to support full duplex, circuit-switched voice calls. More recently, operators of such cellular communications networks have considered enhancing their networks to provide voice dispatch services. There are various options for adding voice dispatch services to conventional cellular communications networks, including a voice dispatch service operating using circuit-switched voice call connections, namely the Real-Time Exchange™ system offered by Kodiak Networks. Other options include providing voice dispatch services over packet-switched network connections, such as General Packet Radio Service (GPRS) connections.

Different mechanisms are known" for charging subscribers for usage of network resources in a telecommunications system. One charging mechanism is for subscribers who enter into a contract with the network operator to pay for usage of network services after such usage, referred to as "post-pay". For post-pay subscribers, the network switches monitor the duration of calls and generate Call Detail Records (CDRs) containing details of the network usage. Such CDRs are sent to a post-pay billing system, and are then used, at the end of each billing period, to generate a bill which is sent to the subscriber for payment. In this mechanism, the billing system does not control usage of network resources in real-time, but rather generates charges after chargeable events have occurred.

An alternative charging mechanism is for what are referred to as "pre-pay" subscribers. In this mechanism, a subscriber pays for usage of network resources in advance, as a result of which an amount of credit is added to a balance of account held for the subscriber in a real-time charging control system called a "pre-pay platform", which controls charging for usage of network resources during such usage. For circuit-switched voice calls, the network switches have built-in mechanisms, which use intelligent network (DSf) signalling to interact with the pre-pay platform. During the call, the serving switch interacts with the pre-pay platform gradually to decrement the balance of account held in the credit record for the subscriber, in real-time. If the balance runs out, the pre-pay platform instructs the switch to terminate the call, and in this way controls usage of network resources.

A conventional mobile communications network is schematically illustrated in FIG. 1. A set of mobile switching centres (MSCs) 2, referred to herein as switching nodes, are connected via communication links to a number of base station controller (BSCs) 4. The BSCs 4 are dispersed geographically across areas served by the switching node 2. Each BSC 4 controls one or more base transceiver stations (BTSs) 6 located remote from, and connected by further communication links to, the BSC. Each BTS 6 transmits radio signals to, and receives radio signals from, mobile terminals 8 which are in an area served by that BTS. That area is referred to as a "cell". A cellular communications network is provided with a large number of such cells, which are ideally contiguous to provide continuous coverage over the whole network territory.

The network includes a pre-pay platform 10, which is connected to each of the switching nodes 2 via signaling links. During a conventional two-way voice call, the switching nodes 2 conduct Intelligent Network (IN) signaling with the pre-pay platform 10 so as gradually to decrement a balance amount stored for the chargeable party for the call during the course of the call.

As mentioned above, a known group communications service is group conference calling. A group conference call service is provided by a group conference call service node 12, which is connected to the switching nodes via circuit-switched voice links. The charging mechanism used during provision of the group conference call service to one or more pre-pay subscribers is illustrated in FIG. 2. Typically, each subscriber dials in to the group conference call service and inputs a conference call identifier to be connected to the other participants of the group conference call. The initiating call leg 14 is set up via its serving switching node 2, and the remaining call legs 16 are set up via their respective serving switch nodes 2 as each other participant successfully dials in. If the initiating party is a pre-pay subscriber, the serving switch node 2 on the initiating call leg 14 performs Intelligent Network (IN) signaling 18 with the pre-pay platform 10 in order to control network resource usage for the initiating party. Further, if any of the other participants are pre-pay subscribers, each respective serving switch node 2 on the other call legs 16 performs Intelligent Network (IN) signaling 20 with the pre-pay platform 10 in order to control network resource usage for each other participant individually, during the call. If any of the pre-pay participants' balance runs out during the call, the pre-pay platform 10 instructs the respective serving switch node to release that participant's call leg.

SUMMARY OF CERTAIN INVENTIVE ASPECTS

The system, method, and devices of the present invention each have several aspects, no single one of which is solely responsible for its desirable attributes. Without limiting the scope of this invention, several of its features will now be discussed briefly.

In accordance with a first aspect of the present invention, there is provided a method of controlling communication between user terminals using a telecommunications network, said method comprising providing a real-time charging control system for controlling usage of network resources during such usage; providing a group communications control node capable of controlling group communications sessions involving more than two participants, each said participant using a different one of said user terminals; and providing an interface between the group communications control node and the real-time charging control system, the interface being configured to enable the group communications control node to transmit charging control signals relating to a group communications session to the real-time charging control system.

In accordance with a second aspect of the present invention, there is provided apparatus for controlling communication between user terminals using a telecommunications network which includes a real-time charging control system for controlling usage of network resources during such usage, said apparatus comprising: a group communications control node capable of controlling group communications sessions involving more than two participants, each said participant using a different one of said user terminals, wherein the group communications control node is configurable to enable the group communications control node to transmit charging control signals relating to a group communications session to the real-time charging control system. Further aspects of the invention are set out in the appended claims.

In some embodiments, the invention provides a group communications system in which improved real-time charging control mechanisms may be implemented to account for usage of group communications services. For example, the invention provides for real-time charging control mechanisms in which charging for the entire group communications session may be applied to a selected single party, preferably a session initiator. However, the tariff to be applied may nevertheless be varied according to the number of participants in the session.

Furthermore, charging for a group communications session may be conducted with the flexibility of being able to charge according to the number of participants, nevertheless without having to transmit separate charging control signals from each participant's leg of the group communications session to the real-time charging control system. With such separate charging control signals being sent, the signaling load in the network would be increased and having to correlate such separate charging control signals in the real-time charging control system would be highly resource intensive.

A further advantage of the invention is that charging for a group communications session may be altered in response to a group communications mode changing, under control of the group communications control node, during a group communications session.

Further advantages and features of the invention will become apparent from the following description.

DETAILED DESCRIPTION OF THE CERTAIN INVENTIVE EMBODIMENTS

Figure 1:
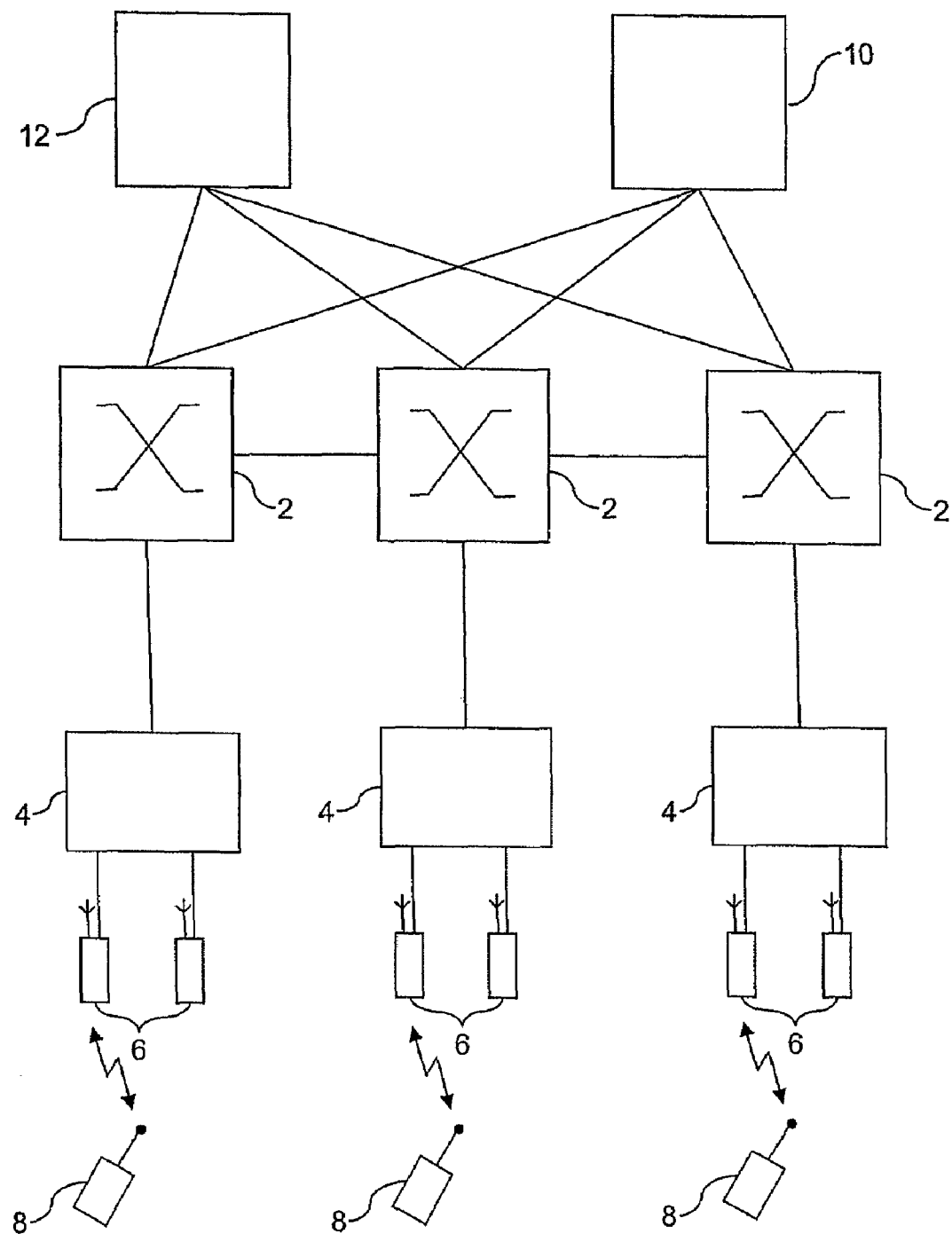
FIG. 1 is a schematic block diagram of a known cellular communications network.
Figure 2:
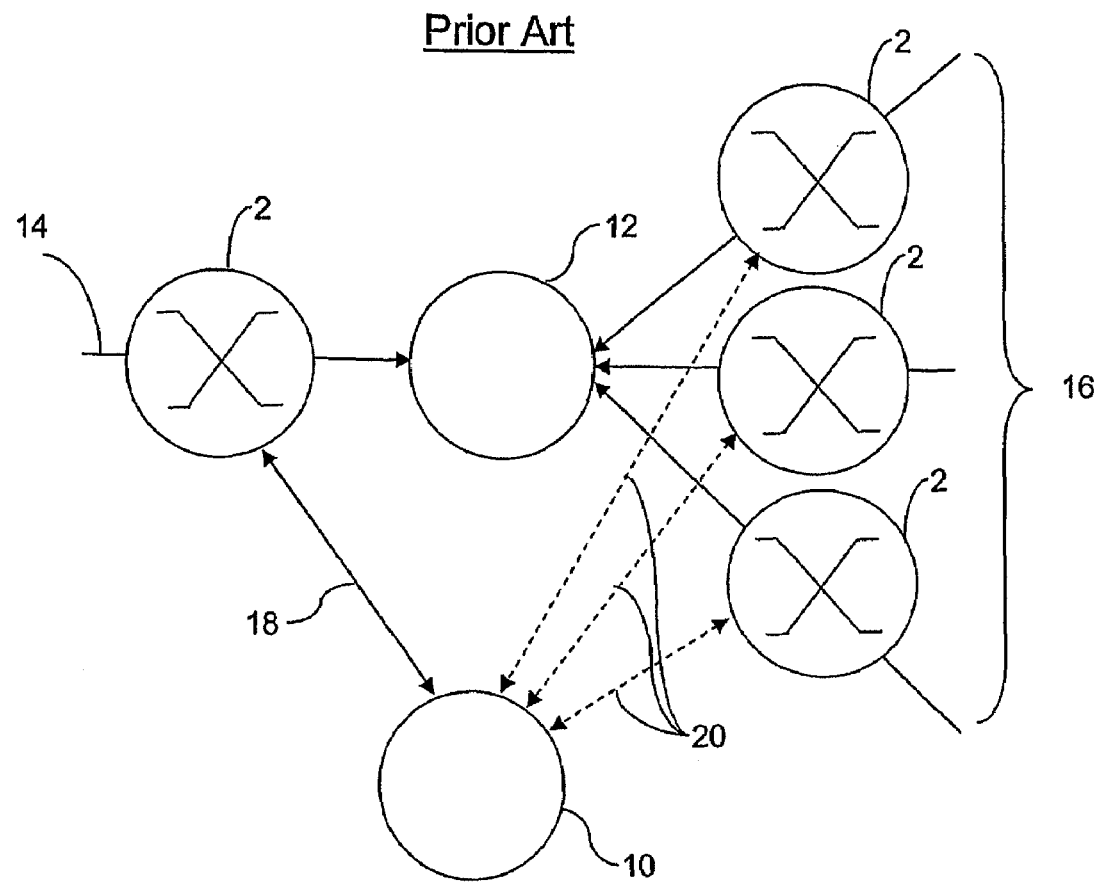
FIG. 2 is a schematic block diagram of a known real-time charging control system in operation during a group conference call.
Figure 3:
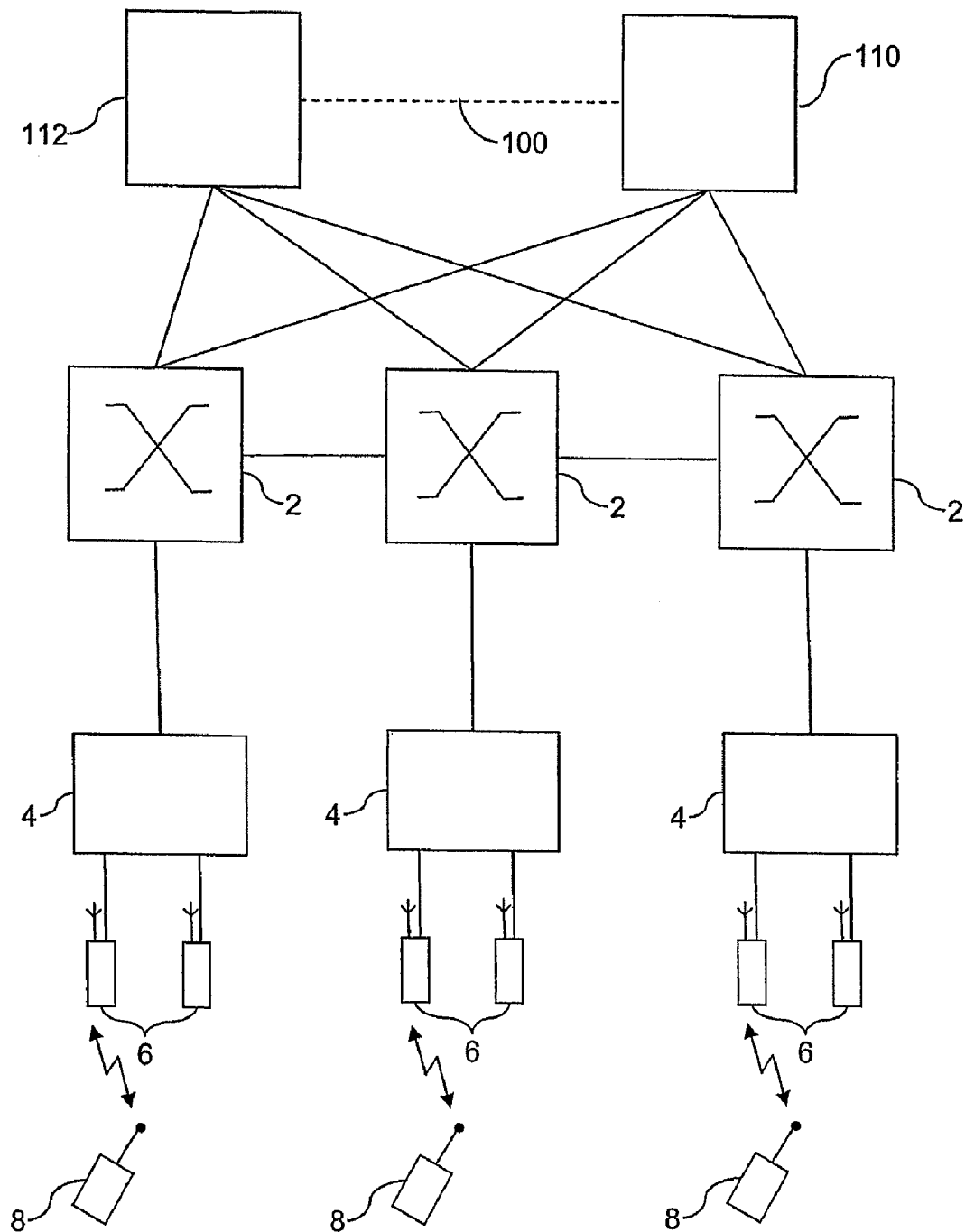
FIG. 3 is a schematic block diagram of a mobile communications network arranged in accordance with the present invention.

A general arrangement of a cellular communications network, in this example a GSM network, used in the present invention is schematically illustrated in FIG. 3. A set of circuit switching nodes in the form of mobile switching centres (MSCs) 2 is connected via communication links to a number of base station controller (BSCs) 4. The BSCs 4 are dispersed geographically across areas served by the switching node 2. Each BSC 4 controls one or more base transceiver stations (BTSs) 6 located remote from, and connected by further communication links to, the BSC. Each BTS 6 transmits radio signals to, and receives radio signals from, mobile terminals 8 which are in an area served by that BTS. That area is referred to as a "cell". A GSM network is provided with a large number of such cells, which are ideally contiguous to provide continuous coverage over the whole network territory.

Each switching node 2 is connected via communications links to other of the switching nodes 2 in the remainder of the mobile communications network, and to other networks such as a public service telephone network (PSTN) (not shown).

The network also includes a packet-switched network infrastructure, such as a GPRS network (not shown). The GPRS network includes GPRS support nodes (GSNs) interconnected by packet switched links. The user terminals 8 are adapted to receive and transmit data via the packet-switched network infrastructure.

The network includes a real-time charging control system 110, which is connected to the switching nodes 2 via signaling links capable of carrying Intelligent Network (IN) signals. Preferably, the real-time charging control system 110 is the network's main pre-pay platform, used both for controlling charging for standard two-party voice calls for the network's pre-pay subscribers and for controlling charging for group communications sessions in accordance with the present invention. The real-time charging control system 110 stores a tariff table, which includes a set of tariffs to be applied in dependence on a subscriber's subscription type and the characteristics of network usage by the subscriber. Further, the real-time charging control system 110 stores, for each of the network's pre-pay subscribers, a balance amount indicating the current amount of credit which the subscriber has to spend on usage of network resources. The balance stored for a particular subscriber can be incremented by the subscriber purchasing such credit in the form of a voucher, by an electronic transaction or suchlike. The stored balance is decremented in real-time during usage of network resources, and when the balance amount reaches a pre-set threshold (e.g. zero), access to chargeable network resources is denied for the subscriber in question, until such time as sufficient balance is again available in the subscriber's account.

In embodiments of the present invention, a group communications control node 112 is connected to the switching nodes 2, and in turn the user terminals 8, via circuit-switched voice links. The group communications control node 112 provides one or more group communications services by controlling communications signals sent between the user terminals 8. The group communications control node is adapted to control group communications sessions involving more than two participants, each said participant using a different one of the user terminals 8. The group communications control node 112 sets up voice circuits with each of the participants in a group communications session, and interlinks the voice circuits by, for example, at least once during a session, bridging the voice circuits in a half-duplex or full-duplex mode, or both.

In accordance with the invention, an interface 100 is provided between the group communications control node 112 and the real-time charging control system 110, the interface 100 being configured to enable the group communications control node 112 to transmit charging control signals to the real-time charging control system 110 during a group communications session.

Figure 4:
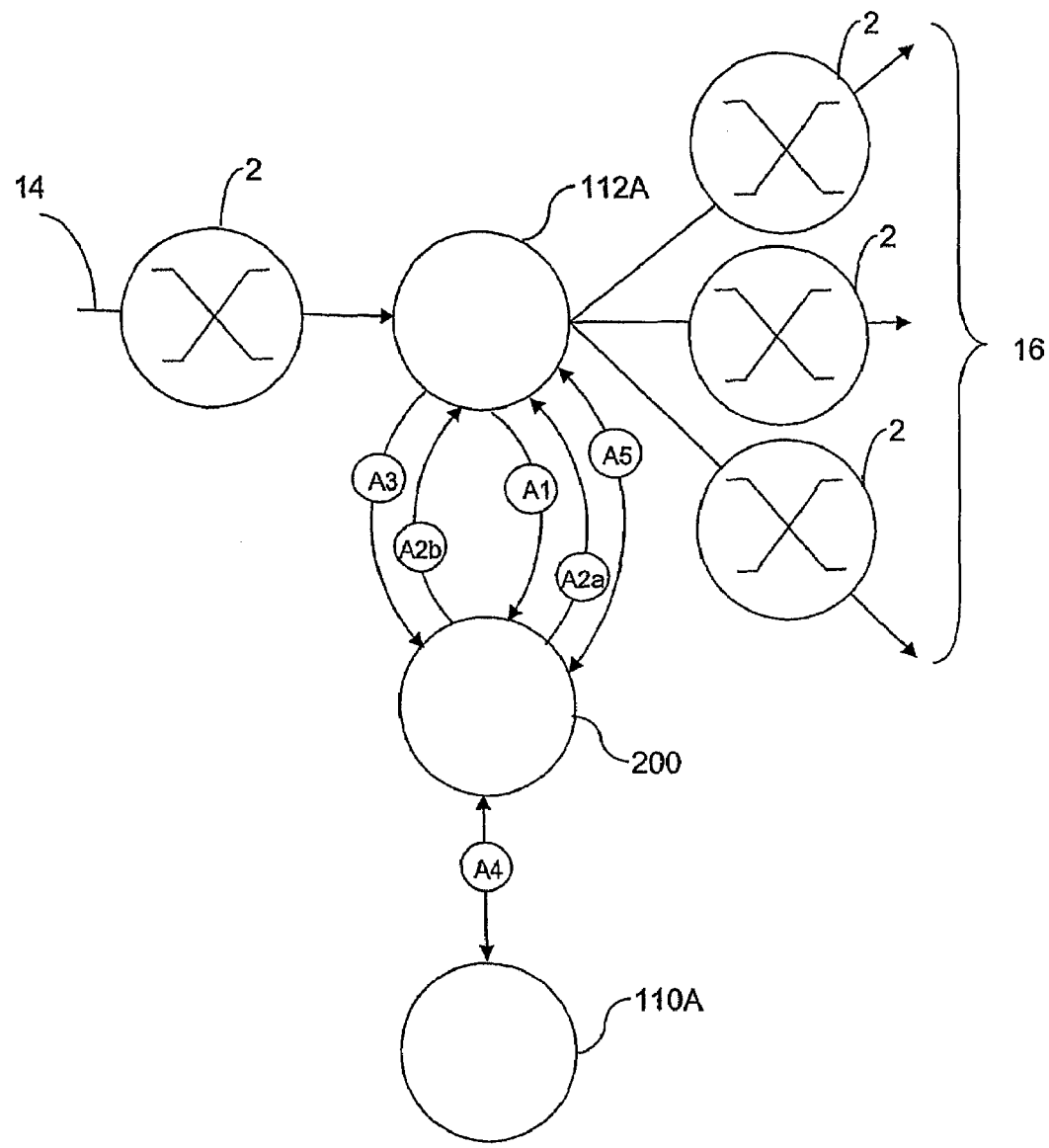
FIG. 4 is a schematic block diagram of a real-time charging control system in operation during a group communications session, arranged in accordance with a first embodiment of the invention.

FIG. 4 is a schematic illustration of a first embodiment of the invention. In this embodiment, a group communications control node 112A is connected to the real-time charging control system 110A via a charging gateway 200. FIG. 4 shows a single initiating group communications session leg 14 and a plurality of other group communications session legs 16 interlinked the group communications control node 112A. The initiating group communications session leg 14 is set up by an incoming request at the group communications control node 112A and the one or more plurality of other group communications session legs 16 set up by outgoing requests from the group communications control node 112A. The group communications session set up request is created for example by the initiating party selecting a group identifier on their mobile terminal 8 and pressing a "call" button. The group communications control node 112A stores a list of group identifiers and, for each group identifier, a set of group member data including a contact address for each group member. For each incoming set up request, one or many outgoing group communications session participation requests are sent by the group communications control node 112A in accordance with the membership of the group identified in the incoming set up request and user availability. The requests are converted into session legs once the requested participant has accepted the participation request, for example by pressing an "answer" button on their mobile terminal 8.

On receipt of the incoming set up request, and during the creation of the outgoing session legs 16, a sequence of charging control messages is exchanged between the group communications control node 112A, the charging gateway 200 and the real-time charging control system 110A, as described below. The charging gateway processes messages received from the group communications control node 112A, and determines the next step to be carried out in response to each message. If the next step is to respond directly to the group communications control node 112A, the charging gateway 200 determines the response type, generates the response message and transmits it to the group communications control node 112A. If the next step is to transmit a message to the real-time charging control system 110A, the charging gateway 200 determines the message type, generates the message and transmits it to the real-time charging control system 110A. Generally, the messages transmitted to the real-time charging control system 110A can include data, in particular charging control data, received from the group communications control node 112A; however the data may be reformatted to a format accepted as an input data format by the real-time charging control system 110A.

(A1) Real-Time Charging Set Up Message

A real-time charging set up message is sent from the group communications control node 112A to the charging gateway 200. This charging set up message includes the following parameters:

(i) one or more chargeable party identities, such as Mobile Subscriber International Subscriber Dialing Numbers (MSISDNs). The group communications control node 112A is configured to select one or more given participants as a chargeable party for the call. In this embodiment, only one participant is indicated as the chargeable party, namely the initiating party for the group communications session.

(ii) a group communications control node identity (ID), whereby to responses to the group communications control node 112A can be addressed. A plurality of such nodes 112A may be present in the network, and the group communications control node ID is used to allow the charging gateway 200 to identify the correct node to conduct signaling with during the remainder of the session. Preferably, the charging gateway stores a list of network addresses against each of the group communication control node IDs, and addresses messages to be transmitted to the group communications control node 112A accordingly;

(iii) group size data relating to the number of participants which are involved in the group communications session. This group size data may be the number of members in the group, the number of members which have accepted the participation request, or both. Either a specific number may be indicated by this number data, or a range of numbers (e.g. 1-5, 6-10, etc.). In any case, the group size data is capable of indicating at least two, and preferably more, different levels of group size;

(iv) a group communications mode identifier;

(v) an indicator to indicate whether the charging set up message is being sent at the start of the group communications session or mid-session; and (vi) a correlation ID for the group communications session, which is stored by the group communications control node 112A for correlation purposes when receiving future messages from the charging gateway 200 relating to the same session. The correlation ID is used by the charging gateway 200 to identify the session in messages transmitted to the group communications control node 112A.

(A2a) Post-Pay Charging Message

The charging gateway 200 determines, from a stored list of pre-pay subscriber identities, whether the chargeable party is a post-pay or pre-pay category of subscriber. This check may be performed at the charging gateway 200, or the charging gateway 200 may request the real-time charging control system 110A to perform such a check. If the chargeable party is a post-pay subscriber, then a post-pay charging message is sent from the charging gateway 200 to the group communications control node 112A. The group communications control node 112A then proceeds to monitor the session and transmits a call detail record (CDR) at the end of the session to a post-pay billing system, rather than applying real-time charging.

(A2b) Real-Time Charging Confirmation Message

If the chargeable party is a pre-pay subscriber, then a real-time charging confirmation message is sent from the charging gateway 200 to the group communications control node 112A, the message including the correlation ID previously sent from the group communications control node 112A.

(A3) Real-Time Charging Initiation Message

After receipt of the real-time charging confirmation message, and when the group communications control node 112A reaches a predetermined point during set up of the session (for example once all invited participants have joined), a real-time charging initiation message is sent to the charging gateway 200. The charging gateway then proceeds to interact with the real-time charging control system 110A in order to commence real-time charging against the account of the chargeable subscriber, as described in step (A4) below. Before charging begins, the charging gateway takes the charging control data which were received in the real-time charging set up message from the group communications control node 112A, and transmits an onward message to the real-time charging control system 110A. The data transmitted include the chargeable party identifier, the group size data, and the group communications session mode indicator.

(A4) Balance Decrementing Messages

Periodically during the session, the charging gateway 200 transmits a balance decrementing message to the real-time charging control system 110A, which then checks the balance available in the account of the chargeable party. If sufficient balance remains, the real-time charging control system 110A responds with a message awarding a predetermined further period of network usage, at the end of which the charging gateway must again send a balance decrementing message. Balance is decremented from the pre-pay account held for the chargeable party in the real-time charging control system 110A at a rate depending on a tariff applied to the session. The tariff applied is selected by the real-time charging control system 110A in dependence upon the characteristics of the session, including the number of participants, the group communications mode used, etc.

(A5) Release Messages

Any time after receipt of the answer message, either the group communications control node 112A or the real-time charging control node 110A can end the interaction between the two during a group communications session, which is confirmed by sending a release message from one to the other. In the more usual case, the group communications session is ended by at least one of the participants ending the session, which is under the control of or detected by the group communications control node 112A. A charging release message is then sent in response from the charging gateway 200 to the group communications control node 112A, and in turn the real-time charging control node 110A. In the less usual case, the chargeable party has run out of balance and the group communications session is torn down under the control of the real-time charging control node 110A, which transmits a release message to the charging gateway 200, and in turn the group communications control node 112A.

The group communications control node 112A and the real-time charging control system 110A may be configured to change the charging model mid-session. For example, if the session is upgraded from a group dispatch voice call to a group conference call, there could be a different tariff applied.

The group communications control node 112A can transmit a change of mode message, thereby changing the tariff and charging will then continue to be applied by the real-time charging control system 110A on the newly applied tariff until the end of the session. Thus, the tariff to be applied can be changed, in response to the communications mode changing, so as to alter the rate of decrement of the balance stored for the chargeable party in the real-time charging control system 110A, during the session.

Also, if the number of legs changes during the group communications session, i.e. legs drop out or new ones are added in, there could be a different tariff applied. The group communications control node 112A can transmit a change of group size message, thereby changing the tariff and charging will then continue to be applied by the real-time charging control system 110A on the newly applied tariff until the end of the session. Thus, the tariff to be applied can be changed, in response to the group size changing, so as to alter the rate of decrement of the balance stored for the chargeable party in the real-time charging control system 110A, during the session.

Figure 5:
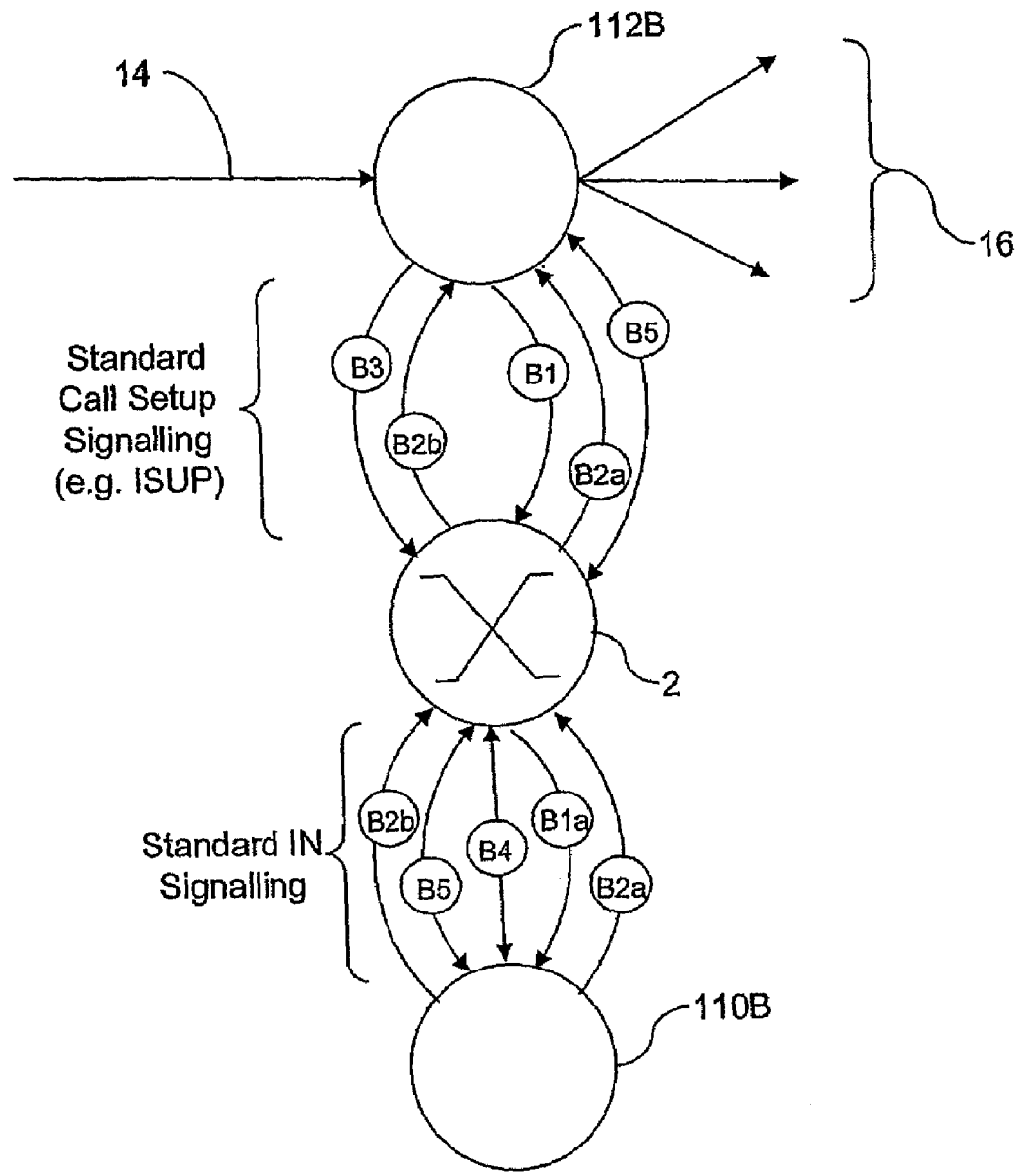
FIG. 5 is a schematic block diagram of a real-time charging control system in operation during a group communications session, arranged in accordance with a second embodiment of the invention.

FIG. 5 illustrates a second embodiment of the invention, in which the real-time charging control system 110B takes the form of a conventional pre-pay platform capable of conducting real-time charging control for conventional two-way voice calls by the exchange of IN signaling with a standard circuit switching node 2. In this embodiment, the group communications control node 112B interfaces with the real-time charging control system 110B via a standard circuit switching node 2. The use of a standard switching node in the interface avoids the need to implement an IN protocol stack in the group communications control node 112B, which could be relatively complex and expensive, thus reducing overall implementation time and cost.

In accordance with this embodiment of the invention, when a group communications session is set up to include the various parties involved, an additional voice call circuit, referred to as the charging control leg, is set up from the group communications control node 112B via a standard circuit switching node 2. The charging control leg is not used to transmit voice signals, but to enable the passing of information between the group communications control node 112B and the real-time charging control system 110B about the session. The charging control leg is also used to allow the real-time charging control system 110B to tear down all the group communications session legs if the subscriber runs out of balance during the session. Further, the charging control leg is looped back to the group communications control node 112B in order to allow additional control of the session by the real-time charging control system 110B.

Whilst the charging control data is transmitted in this case using a voice circuit, the second embodiment has many features in common with the first embodiment described above. For the sake of brevity, it should be understood that characteristics and features of the method described above in relation to steps A1 to A5 described above in relation to FIG. 4, should be taken to apply correspondingly to steps B1 to B5 described below in relation to FIG. 5.

(B1) Real-Time Charging Set Up Messages

When a group communications session is initiated by a user as an incoming circuit switched voice call 14, it is first routed to the group communications control node 112B, which determines how many outgoing legs are to be set up, based on the requested group identity and user availability. The group communications control node 112B then dials out to each of the other participants in the group via outgoing circuit switched voice call legs 16. The group communications control node 112B also dials out, using standard call set up signaling, in this embodiment Integrated Services Digital Network User Part (ISUP) signaling, an additional circuit switched voice call, namely the charging control leg. The call set up message is constructed such that the "A party" (calling party) identifier set to the identity of the session initiator and the "B party" (called party) identifier being in the form of a string of digits containing charging control data about the session. Li this embodiment, the "B party" identifier is set to the following value:

> [prefix 1]+[number of outgoing legs]+[start of session indicator]+[group communications session mode indicator]

The switching node 2 in the network receiving the charging control leg set up requests from the group communications control node 112B has a standard IN trigger configured against the digits [prefix1], which points to the real-time charging control system 110B. When the charging control leg is set up, the IN trigger is encountered and a standard IN "InitialDP" message is sent to the real-time charging control system 110B (step BIa in FIG. 5). This includes the "B party" identifier constructed to include various charging control data as described above.

(B2a) Post-Pay Charging Message

When the real-time charging control system 110B receives the "InitialDP" message, the "A party" identifier is checked against the stored pre-pay subscriber records to determine whether the chargeable party is a pre-pay subscriber or not. If the chargeable party is not pre-pay, the real-time charging control system 110B issues a "Release Call" message back to the switching node. A "Release" message, indicating that post-pay charging is to be applied, will then be sent down the charging control leg back to the group communications control node 112B. In this case, the group communications control node 112B continues to process the group communications session as one in which the chargeable party is a post-pay subscriber, as described above. No further processing is carried out by the real-time charging control system 110B.

(B2b) Real-Time Charging Confirmation Message

If the initiating user is a pre-pay subscriber, then the real-time charging control system 110B checks the balance available and, if sufficient balance is available, sends a "Connect" message to [prefix2], which is the network address of the group communications control node 112B. When the switching node receives the "Connect" message, the voice call is routed to the destination [prefix2] which thus loops back to the group communications control node 112B, which treats the receipt of the looped-back voice call as a real-time charging confirmation message.

(B3) Real-Time Charging Initiation Message

On receipt of the looped voice call, the group communications control node 112B returns an "Answer" message (step (B3) in FIG. 5) which causes the pre-pay charging to start. The "Answer" message is looped back to the group communications control node 112B down the circuit set up in step B1 described above.

Note that the charging control leg is now looped out of the group communications control node 112B, into the switching node and back out to the group communications control node 112B again. It is not however bridged into the other incoming and outgoing legs associated with the group communications session.

(B4) Balance Decrementing Messages

On receipt of the "InitialDP" message or, subsequently, a standard IN "Apply Charging Report" message from the switching node 2, the real-time charging control system 110B checks the amount of balance available and calculates the amount of time that the session will be allowed to go on for during a subsequent call timer period. The session characteristics such as number of legs and the group communications mode can be used to calculate the correct tariff for the session. The allocated amount of time (a number of seconds) is sent back to the switching node in a standard IN "Apply Charging" message, together with a "Connect" message to [prefix2]. The switching node then monitors the time allocated using a call timer.

The group communications session continues provided the switching node 2 has received a time allocation on the charging control leg from the real-time charging control system 110B. The charging is meanwhile being applied on the charging control voice circuit by the real-time charging control system 110B. Periodically, when the call timer runs out, the switching node on this voice circuit will check with the real-time charging control system 110B by the use of an "Apply Charging Report" message to check if balance still remains, and to receive a further time allocation in an "Apply Charging" message.

(B5) Release Messages

If the group communications session ends normally at the request of one of the participants, the charging control leg is released by the group communications control node 112B and switching node 2 signals to the real-time charging system 110B that charging should end.

If the real-time charging control system 110B detects during the course of the session that no balance remains in the account of the chargeable party, it will send an IN "Release Call" message to the switching node, which in turn sends a "Release" message down the charging control leg to the group communications control node 112B. The group communications control node 112B then tears down all the voice call legs in the session.

Note that, if no balance is initially available at the start of the session, rather than using a "Release Call" message, an "Apply Charging" message (described above) is transmitted, with the amount of time allocated set to zero. In this manner, the "Connect" message results in the call set up being completed before a "Release" message being sent down the charging control leg back to the group communications control node 112B. The group communications control node 112B is configured to distinguish between the case in which the chargeable party is a post-pay subscriber, and the case in which the chargeable party is a pre-pay subscriber but has no available balance at the start of the call, and it does so by detecting whether the "Release" message is received before or after call set up being completed.

The group communications control node 112B and the real-time charging control system 110B may be configured to change the charging model mid-session. For example, if the session is upgraded from a group dispatch voice call to a group conference call, there could be a different tariff applied. The group communications control node 112B can release the charging control voice circuit, thereby applying the pre-pay charges incurred up to that point. It can then immediately create a new charging control voice circuit as above, except with the group communications session mode indicator in the "B party" identifier changed. Charging will then continue to be applied by the real-time charging control system 110B on the newly applied tariff until the end of the session. Thus, the tariff to be applied can be changed, in response to the communications mode changing, so as to alter the rate of decrement of the balance stored for the chargeable party in the real-time charging control system 110B, during the session.

Also, if the number of legs changes during the group communications session, i.e. legs drop out or new ones are added in, the charging control voice circuit can be disconnected in a similar manner to that described above. A new charging control voice circuit can then be recreated as described above, except with the number of outgoing legs set to the new value in the "B party" identifier. Thus, the tariff to be applied can be changed, in response to the group size changing, so as to alter the rate of decrement of the balance stored for the chargeable party in the real-time charging control system 110B, during the session.

Note the following characteristics of the mechanism of the second embodiment described above:

(a) The charging control leg is empty of voice traffic but allows IN signalling to assist with pre-pay control of the service. Normally, standard IN signalling is applied on top of the circuit where the voice travels, which limits the amount of non-routing data than can be conveyed to other systems. By creating a special voice circuit, much more data about the call can be transmitted over standard IN messages.

(b) Normally, IN information is fixed at the outset of the call and cannot be changed. However, using separate charging control legs, as many charging control legs as necessary can be created, destroyed and recreated for each call. Even more than one charging control leg may be created simultaneously for one call, if the complexity of the charging models used is such that additional information should be made available to the real-time charging control system during the call. This behaviour is not possible with standard IN signalling since the voice circuit would be lost completely if a "Release Call" message is sent mid-session. The existence of an empty charging control leg avoids such loss.

(c) Only one IN relationship is needed on the charging control leg to deal with as many participants as there are in the session. If standard IN triggering were to be adopted, then one IN relationship per leg would be necessary. This greatly reduces the signalling load on the network elements and allows complex charging models to be applied reliably.

(d) The actual charging models that can be offered include changing the tariff to be applied mid-session.

One group communications mode which may be employed in each of the above embodiments using the group communications control node 112 is a group voice dispatch mode, also known as a Push To Talk (PTT) calling mode. The node is then configured as a group voice dispatch mode server, and the user terminals 8 are enabled with PTT functionality, as is known in the art, for example using the Real-Time Exchange™ system designed by Kodiak Networks. To seize the call group, following call set up, any participant may push a PTT button on their user terminal 8 in a period of inactivity, that is to say when no voice signals are currently being received, seize the call group, and transmit voice signals to each other participant via the group communications control node 112. The group voice dispatch mode is by nature half-duplex, insofar as only one party to the call may transmit voice data at a time.

A further group communications mode which may be employed in each of the above embodiments using the group communications control node 112 is a group conference call mode, as is known in the art. In this mode, the group communications control node 112 allows the simultaneous transmission and reception of voice signals, and therefore, the group communications session may be controlled in order to provide a full-duplex group call. In this case, none of the parties "seizes" the group session, and no party is prevented from transmitting voice signals when receiving voice signals. In this mode, the group communications server creates a single outgoing audio signal for each participant by overlaying all other participant's incoming voice signals onto a single outgoing audio signal.

The particular group communications mode employed is preferably selectable by the user of the initiating user terminals 8 via interactions with the man machine interface, e.g. the keypad, which results in the appropriate call control signals to be sent to the group communications control node 112. The group communications node is configured to signal this change of session mode to the real-time charging control system 110, where a different charging scheme may be applied at the point during the call when the call mode is switched. This is to be contrasted with conventional real-time call usage control, which is only capable of applying a charging scheme on the basis of whether a communications session is in existence, and is not able to change the charging scheme used during a communications session.

Control signals between the user terminals 8 and the group communications control node 112 may be carried using signaling during call set-up, in-call during the existence of a voice call circuit, and/or via the packet network infrastructure described above.

The above embodiments are to be understood as illustrative examples of the invention. Further embodiments of the invention are envisaged. For example, whilst the group communications sessions described in the above-described embodiments are implemented using circuit-switched links with the user terminals, in alternative embodiments of the invention, the links may be packet-switched links, for example GPRS voice links.

Again, in this example, rather than charging being applied by the GPRS network infrastructure individually to each participant according to the amount of data being transmitted or received by each participant, charging can be applied by the group communications control node, thereby allowing more flexible and improved charging mechanisms. It is to be understood that any feature described in relation to any one embodiment may be used alone, or in combination with other features described, and may also be used in combination with one or more features of any other of the embodiments, or any combination of any other of the embodiments. Furthermore, equivalents and modifications not described above may also be employed without departing from the scope of the invention, which is defined in the accompanying claims.

What is claimed is:

1. A method of controlling communication between user terminals using a telecommunications network, the method comprising:

providing a real-time charging control system for controlling usage of network resources; during such usage;

providing a group communications control node configured to control group communications sessions involving more than two participants, each participant using a different one of the user terminals; and providing an interface between the group communications control node and the real-time charging control system, the interface being configured to allow the group communications control node to transmit charging control signals relating to a group communications session to the real-time charging control system, wherein the interface includes an intermediate circuit switching node which receives signals from the group communications control node and transmits signals to the real-time charging control node, and wherein the intermediate circuit switching node is arranged to process the received signals and to determine, based on the processing, at least one of the content and format of messages to transmit to the real-time charging control node.

2. A method according to claim 1, wherein the group communications control node is configured to generate the charging control signals to include an identifier to indicate at least one chargeable party for a group communications session.

3. A method according to claim 1, wherein the group communications control node is configured to generate the charging control signals to be indicative of a number of participants in the call.

4. A method according to claim 1, wherein the group communications control node is arranged to transmit call-related signaling to the intermediate circuit switching node, the call-related signaling including charging control data.

5. A method according to claim 4, wherein the charging control data is transmitted in a call set up request.

6. A method according to claim 1, wherein the intermediate circuit switching node is arranged to transmit Intelligent Network signaling to the real-time charging control node, and wherein the Intelligent Network signaling includes charging control data.

7. A method according to any claim 1, wherein the intermediate circuit switching node is configured to transmit group communications session control signals to the group communications control node.

8. A method according to claim 7, wherein the group communications session control signals are transmitted as call-related signaling.

9. A method according to claim 1, wherein the group communications control node operates by using circuit switched voice call links with user terminals.

10. A method according to claim 1, wherein the group communications control node operates using packet switched voice call links with user terminals.

11. A method according to claim 1, wherein the real-time charging control system is configured to generate session control signals and to transmit the generated session control signals to the group communications control node in response to receiving the charging control signals.

12. A method according to claim 11, wherein the session control signals include at least one session release signal for ending a group communications session.

13. A method according to claim 1, further comprising transmitting the charging control signals in a call set up request from the group communications control node.

14. A method of controlling communication between user terminals using a telecommunications network, the method comprising:

controlling usage of network resources during such usage using a real-time charging control system;

controlling a group communications session involving more than two participants, each participant using a different one of the user terminals; and transmitting charging control signals from the group communications session to the real-time charging control system, wherein the group communications control node is configured to include a group communications mode indicator in the charging control signals.

15. A method according to claim 14, wherein the group communications control node is configured to control a group communications session in a group dispatch mode.

16. A method according to claim 15, wherein the charging control signals includes a group dispatch mode indicator.

17. A method according to claim 14, wherein the group communications control node is configured to control a call in a group conference call mode.

18. A method according to claim 17, wherein the charging control signals include a group conference call mode indicator.

19. A method of controlling communication between user terminals using a telecommunications network, the method comprising:

providing a real-time charging control system for controlling usage of network resources during the usage of the telecommunications network;

providing a group communications control node capable of controlling group communications sessions involving two or more participants, each participant using a different one of the user terminals;

commencing a group communications session using the group communications control node and applying real-time charging using the real-time charging control system;

after commencement of the session, altering characteristics of the session using the group communications control node; and substantially concurrently with altering characteristics of the session, altering characteristics of the real-time charging using the real-time charging control system, wherein the group communications control node transmits charging control signals to the real-time charging control system indicating a change of session characteristics during an existing group communications session.

20. A method according to claim 19, wherein the change of session characteristics indicated includes a change in group communications session mode.

21. A method according to claim 19, wherein the change of session characteristics indicated includes a change in a number of participants in the group.

22. A method according to claim 19, wherein real-time charging is altered in concert with a change in group communications mode.

23. A method according to claim 19, wherein real-time charging is altered in concert with a change in group size.

24. A method of controlling communication between user terminals using a telecommunications network, the method comprising:

providing a real-time charging control system for controlling usage of network resources;

providing a group communications control node capable of controlling group communications sessions involving two or more participants, each participant using a different one of the user terminals; and providing an interface between the group communications control node and the real-time charging control system, the interface being configured to allow the group communications control node to transmit charging control signals relating to a group communications session to the real-time charging control system, wherein the charging control signals are transmitted at least in part by call set up signaling.

25. A method according to claim 24, wherein the interface includes a circuit switching node, and wherein the call set up signaling is transmitted to the circuit switching node.

26. An apparatus arranged to carry out the method of claim 24.

27. An apparatus for controlling communication between user terminals using a telecommunications network which includes a real-time charging control system for controlling usage of network resources, the apparatus comprising:

a group communications control node configured to control group communications sessions involving more than two participants, each participant using a different one of the user terminals, wherein the group communications control node is configured to enable the group communications control node to transmit charging control signals relating to a group communications session to the real-time charging control system;

an interface between the group communications control node and the real-time charging control system, wherein the interface includes an intermediate circuit switching node configured to receive signals from the group communications control node and further configured to transmit signals to the real-time charging control node, and wherein the intermediate circuit switching node is arranged to process the received signals and to determine, based on the processing, at least one of the content and format of messages to transmit to the real-time charging control node.

* * * * *